US006199837B1

United States Patent
Leonard et al.

(10) Patent No.: US 6,199,837 B1
(45) Date of Patent: Mar. 13, 2001

(54) THERMOPLASTIC ELASTOMER AIR SPRING

(75) Inventors: Daniel J. Leonard, Carmel; Keith E. Hoffman, Spencer, both of IN (US); Joseph L. Tazewell, deceased, late of Brooklyn, NY (US), by Joseph L. Tazewell, Jr., executor

(73) Assignee: Bridgestone/Firestone, Inc., Akron, OH (US)

( * ) Notice: Subject to any disclaimer, the term of this patent is extended or adjusted under 35 U.S.C. 154(b) by 0 days.

(21) Appl. No.: 09/071,421

(22) Filed: May 1, 1998

(Under 37 CFR 1.47)

(51) Int. Cl.[7] .......................................................... F16F 9/04
(52) U.S. Cl. ........................ 267/64.27; 267/122; 267/124
(58) Field of Search .............................. 267/64.27, 64.19, 267/64.21, 64.23, 122, 124; 92/103 SD

(56) References Cited

U.S. PATENT DOCUMENTS

| | | | |
|---|---|---|---|
| 3,815,885 | 6/1974 | Moulton et al. | 267/65 B |
| 4,722,516 | * 2/1988 | Gregg | 267/64.27 |
| 4,864,918 | 9/1989 | Martin | 92/103 SD |
| 5,005,808 | 4/1991 | Warmuth, II et al. | 267/64.27 |
| 5,009,401 | 4/1991 | Weitzenhof | 267/64.21 |
| 5,201,500 | 4/1993 | Ecktman et al. | 267/140 |
| 5,342,139 | 8/1994 | Hoffman | 403/405.1 |

* cited by examiner

Primary Examiner—Robert J. Oberleitner
Assistant Examiner—Pamela J. Lipka
(74) Attorney, Agent, or Firm—Michael Sand; D. A. Thomas; John M. Vasuta

(57) ABSTRACT

An air actuator has a rigid piston at one end and a rigid housing and end cap at the other end with an intervening elastomeric flexible sleeve extending therebetween which forms a fluid pressure chamber. The rigid piston, elastomeric flexible sleeve, and rigid housing are all injection or blow molded as one integral piece of preferably a thermoplastic elastomer, while the end cap is injection or blow molded as a second integral piece of preferably a thermoplastic elastomer that is thereafter welded to the rigid housing to define an internal chamber that is pressurizable. The first piece consisting of the piston, flexible membrane and housing, is configured such that the walls of the housing and piston are thick and rigid while the walls of the flexible membrane are thin and thus flexible, thereby allowing the membrane to roll and bend such that the piston may axially move in relation to the housing.

21 Claims, 2 Drawing Sheets

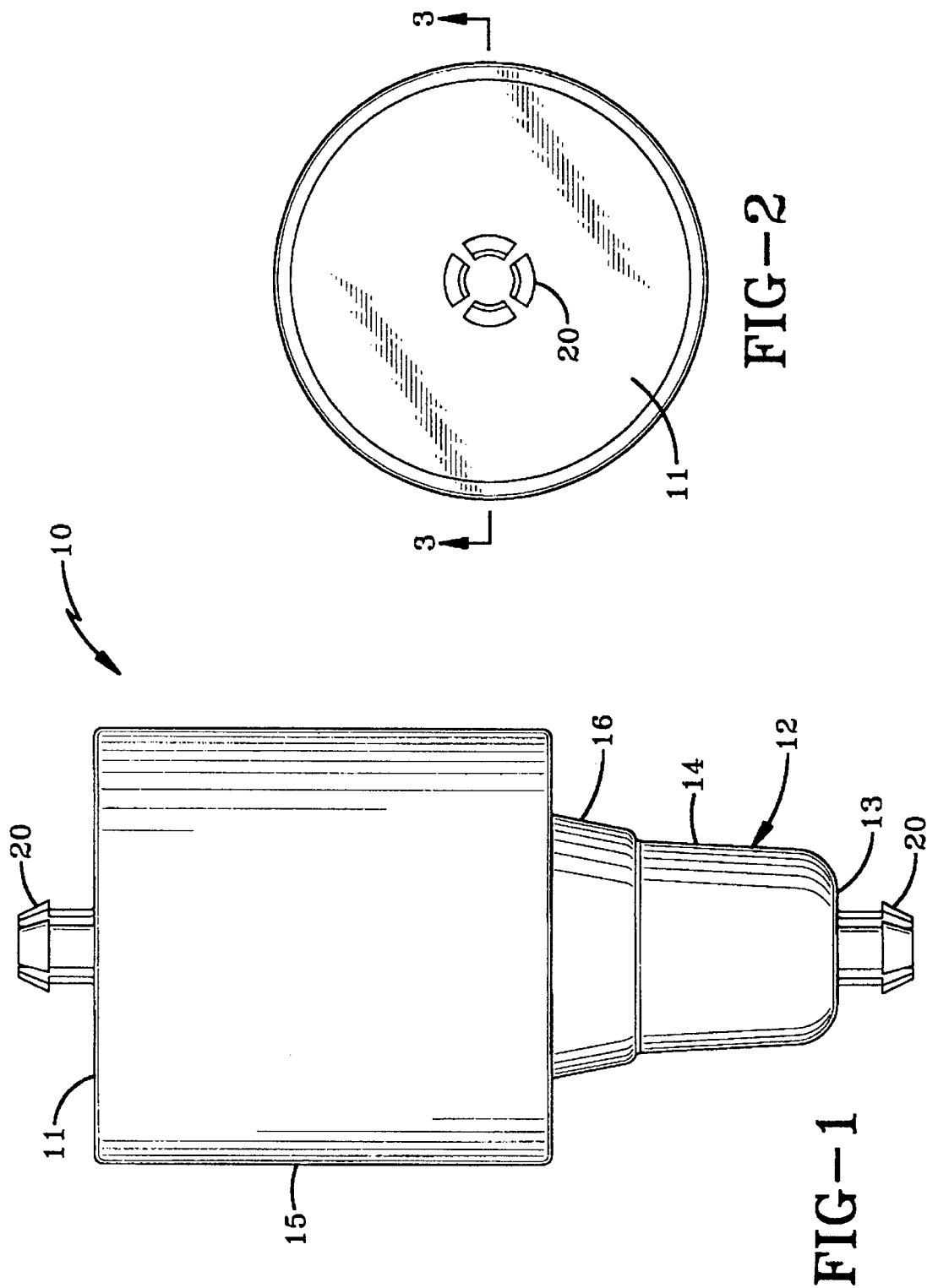

THERMOPLASTIC ELASTOMER AIR SPRING

BACKGROUND OF THE INVENTION

1. Technical Field

The invention relates to air actuators, including air springs. More particularly, the invention relates to thermoplastic elastomeric air springs having a molded part containing a cap or piston and a rolling membrane all of which are of a nonreinforced construction that is injection or blow molded, where the integral cap and/or piston of the assembly may include integral interface clips for attachment to machinery or brackets, and where a separate cap or piston is attachable to the molded part to complete the air spring assembly. Specifically, the invention is a thermoplastic elastomeric nonreinforced air spring of an injection or blow molded design with an integral cap and/or piston having integral interface clips thereon where the air spring includes a thick rigid housing with an integral snap-fit therein, a thick rigid piston with an integral snap-fit therein where the thick rigid piston has a lesser diameter than the thick rigid housing and is seatable therein, and a thin rolling membrane extending between the thick rigid piston and the thick rigid housing, thereby defining an internal fluid pressure chamber that is pressurizable with a compressed fluid when an end cap is welded to the thick rigid housing.

2. Background Information

Pneumatic assemblies such as air actuators and springs have been used for many years for various purposes. The air actuator usually consists of a flexible rubber sleeve or bellows containing a supply of compressed fluid and a feed for increasing or decreasing the compressed fluid therein. The flexible sleeve is formed of a flexible elastomeric material often containing reinforcing cords, where the flexibility of the material permits a first end cap to move axially with respect to another end cap secured within the ends of the sleeve as the amount of compressed fluid is changed. Since the air actuator is positioned in between a movable or actuatable object and typically a fixed object, the movable object moves in correlation to this axial movement.

As to pneumatic springs, commonly referred to as air springs, the construction is similar with a flexible rubber sleeve or bellows containing a supply of compressible fluid. However, the air spring has one or more pistons movable with respect to the flexible sleeve. This piston causes compression and expansion of the fluid within the sleeve as the sleeve stretches or retracts, respectively, thereby absorbing shock loads and/or dampening vibrations. The flexible sleeve is formed of a flexible elastomeric material containing reinforcing cords and this permits the piston to move axially with respect to another piston or end cap secured within open ends of the sleeve. One application for such air springs is with motor vehicles where the spring provides cushioning between movable parts of the vehicle, primarily to absorb shock loads impressed on the vehicle axles by the wheel striking an object in the road or falling into a depression.

The general state of the art in this industry of air springs involves the current technology of the flexible sleeve being constructed of rubber that is reinforced with nylon cord. This nylon reinforced rubber sleeve must be attached in some manner to the piston or end caps on each end; which is presently accomplished by various forms of clamp assemblies. However, often these clamp assemblies present a problem in that ineffective sealing and/or clamping of the flexible sleeve to the end caps causes a lack of an airtight seal, which is critical to the functioning of an air spring.

In addition, another problem with existing air actuators and springs is the requirement of reinforcing the rubber sleeve with nylon or equivalent reinforcing cords. This reinforcing step adds extra expense and time to the manufacturing process of the overall air spring.

These and other problems and disadvantages exist in the current technology of air springs and air actuators. One of skill in the art will recognize and understand the above listed problems as well as others not described at this time. For this reason, a new and improved air spring and/or air actuator is needed having the objectives and advantages listed below.

SUMMARY OF THE INVENTION

Objectives of the invention include providing an improved air spring and/or air actuator.

A further objective of the invention is to provide such an improved air spring and/or air actuator which is constructed out of improved materials such as thermoplastic elastomers.

A further objective of the invention is to provide such an improved air spring and/or air actuator in which all of the housing, sleeve, and pistons and/or end caps are manufactured out of a nonmetallic material, and preferably out of a thermoplastic elastomer.

A further objective of the invention is to provide such an improved air spring and/or air actuator having a flexible membrane or sleeve made out of a material not requiring reinforcing cord such as nylon.

A further objective of the invention is to provide such an improved air spring and/or air actuator of an improved construction in which the thin rolling flexible membrane or sleeve is integrally attached to the rigid housing and/or end cap and the rigid piston actuatable therein.

A further objective of the invention is to provide such an improved air spring and/or air actuator that is substantially one integrally molded piece, that is, that has a rigid housing and a rigid piston that are integrally attached by a rolling membrane.

A further objective of the invention is to provide such an improved air spring and/or air actuator that is substantially one integral piece comprising a rigid housing and rigid piston connected by a rolling membrane all of which are injection or blow molded.

A further objective of the invention is to provide such an improved air spring and/or air actuator in which the end cap that closes the rigid housing to form the internal fluid pressure chamber is welded or otherwise affixed to the thick rigid housing in a leak-proof and pressurizable manner.

A further objective of the invention is to provide such an improved air spring and/or air actuator in which the snap-fit connections are integrally positioned within each of the end cap and piston so as to function as interface clips for assembly to machinery and/or bracketry.

A further objective of the invention is to provide such an improved air spring and/or air actuator that is economical to make for use in low cost air actuating environments.

These objectives and advantages are obtained by the improved air spring of the present invention, the general nature of which may be stated a s including an integrally molded body and an integrally molded cap. The integrally molded body includes a thin walled, flexible membrane extending between a thick walled, rigid housing and a thick walled, rigid piston thereby defining an internal chamber open only at an end of the housing opposing the piston, whereby the flexible membrane selectively rolls as the housing and piston are axially moved to an d away from one another. The integrally molded cap is attachable within the open end to enclose the internal chamber.

BRIEF DESCRIPTION OF THE DRAWING

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is an elevational view of the improved air spring;

FIG. 2 is a t op view of the improved air spring of FIG. 1;

Similar numerals refer to similar parts throughout the drawings.

DESCRIPTION OF THE PREFERRED EMBODIMENT

Figure 3:
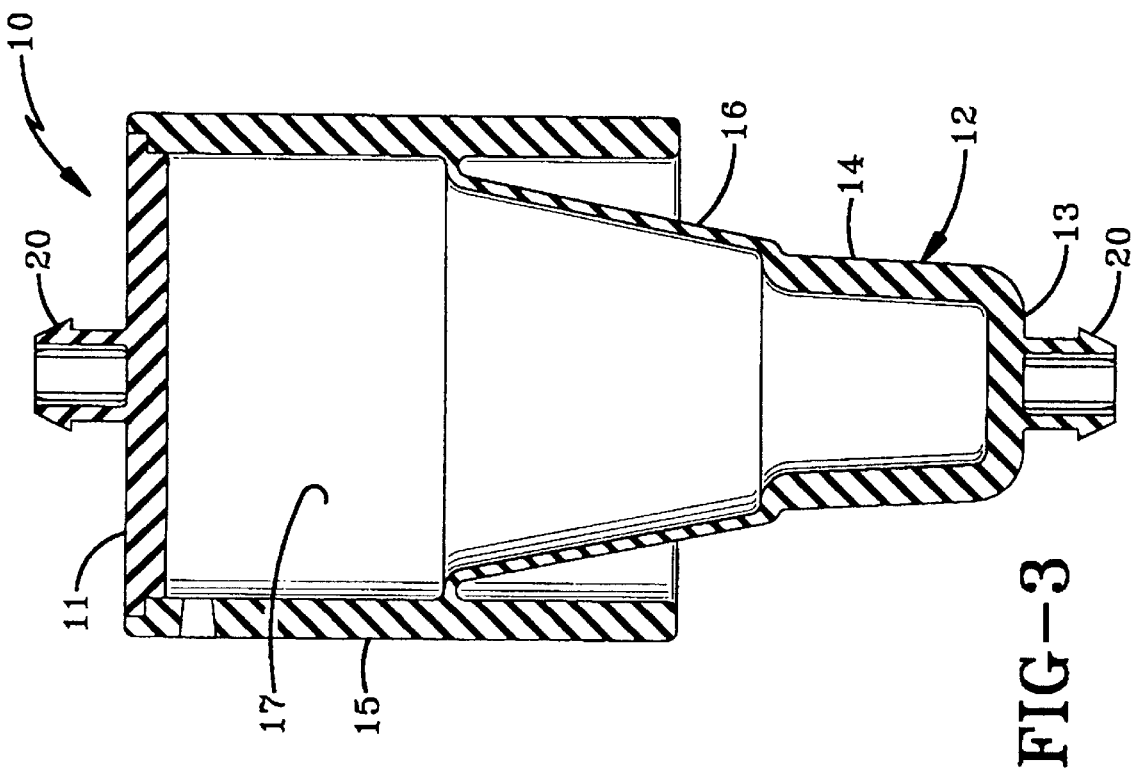
FIG. 3 is a side sectional view taken along line 3—3 in FIG. 2 of the improved air spring of FIGS. 1 and 2, where the air spring is in a fully actuated or pressurized position.

The improved air spring and/or air actuator is shown in FIG. 1 and indicated generally at 10. Air spring 10 includes axially spaced end members indicated generally at 11 and 12, respectively, as best shown in FIG. 3. In the embodiment shown, end member 11 is a substantially planar cap 11, while end member 12 is a rigid piston having a base 13 with annular side wall 14 extending therefrom. Air actuator 10 also includes a rigid housing 15 and a flexible elastomeric sleeve 16.

In accordance with one of the features of the invention, the rigid piston 12, rigid housing 15, and flexible sleeve 16 are injection or blow molded as one piece of preferably a thermoplastic elastomer such as the polyester elastomer Hytrel® as manufactured and marketed by Dupont, or urethane. This new one-piece molded construction eliminates the need for clamping rings which in the prior art connected the flexible sleeve 16 to piston 12 and housing 15.

In further accordance with this feature of the invention, the rigid housing 15 is molded so as to have a substantial thickness in comparison to flexible sleeve 16 whereby such thickness provides structural integrity and rigidity to the housing such that the housing becomes load-bearing. Similarly, and in accordance with one of the features of the invention, the rigid piston 12 is also of a substantial thickness so as to provide structural integrity and rigidity thereby becoming load-bearing. In effect, rigid piston 12 and rigid housing 15 are substantially stiff and unflexing members that move in conjunction with one another based upon the pressure changes within pressurized internal chamber 17 as adjusted for by flexible sleeve 16. To comply with conventional molding practices, the thicker walls may be ribbed to add the necessary strength characteristics while maintaining the continuous molded wall cross sectional thicknesses advantageous for some molding processes.

Figure 4:
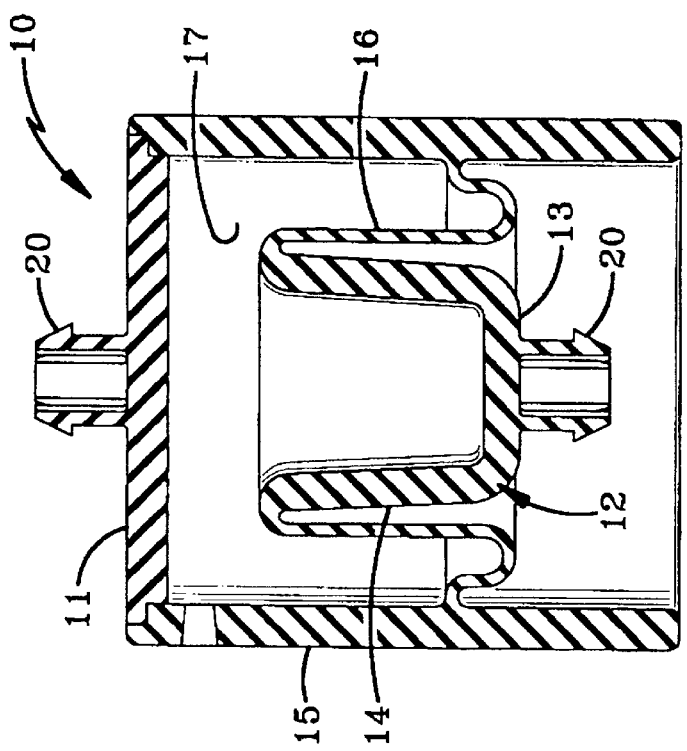
FIG. 4 is the same side sectional view as FIG. 3 of the improved air spring except that it is in a substantially deflated or unpressurized position.

In further accordance with the invention, flexible sleeve 16 is molded to be of a thin walled construction so as to provide flexible characteristics such that the sleeve 16 may roll as necessary from the position in FIG. 3 at a substantially fully pressurized setting to the position in FIG. 4 at a substantially unpressurized setting. In effect, a portion (16) of the one-piece molded part (12, 15, and 16) is of such a thin wall that it is flexible so as to bend and roll as needed during use of the air spring and/or air actuator 10, while the remainder (12, 15) is of a substantially thick wall so as to be rigid in nature.

In further detail, flexible sleeve 16 is molded so as to connect with rigid piston 15 along its interior annular surface about a mid-section as is clearly shown in FIGS. 3 and 4. The flexible sleeve 16 is molded to rigid housing 15 in a manner in which flexible sleeve 16 radially extends inward towards a central axis from rigid housing 15.

Flexible sleeve 16 at its opposite end is connected to rigid piston 12 about the outermost annular edge of rigid piston 12 at the distal end of wall 14 in relation to base 13. Flexible sleeve 16 is molded to rigid piston 12 in an outwardly angled manner from this distal edge.

The molding of the piston 12 is such that it is substantially cylindrical in shape although the walls may taper slightly outward from their proximate end adjacent base 13 to their distal end. In contrast, flexible sleeve 16 is molded in a conical shape so as to extend from a minimal or smallest diameter area at its connection to piston 12 to a maximum or largest diameter area at its connection to housing 15. This conical shape or taper is necessary so as to allow flexible sleeve 16 to roll as piston 12 enters into and seats substantially within housing 15 as is shown in FIG. 4. This taper or conical shape allows the flexible sleeve to remain out of the way of piston 12 and housing 15 as this rolling occurs. Furthermore, this tapered shape and the spacing differential between piston 12 and housing 15 allows for the wall of flexible sleeve 16 to depart from a substantially planar cross-sectional position from housing 15 to piston 12 when fully inflated, as shown in FIG. 3, to a rolled position, as shown in FIG. 4, which includes a pair of curves in cross-section somewhat adjacent to each of the connections of the flexible sleeve 16 to the piston 12 and housing 15.

In accordance with another feature of the invention, snap fit connectors are integrally molded in each of the ends 11 and 13 of the air spring. Specifically, snap fit connectors 20 are molded into end cap 11 and base 13 to allow for easy interfacing in a clipping manner to the various machine parts and/or bracketry thereof in which shock absorption or dampening therebetween is desired. Each of these clips may be integrally molded of the thermoplastic elastomer of the piston 12, housing 15 and flexible sleeve 16; or may be parts properly positioned so as to have the piston 12 and end cap 11 integrally molded therearound.

In accordance with another feature of the invention, end cap 11 is integrally molded, as indicated above, with clip 20 therein. End cap 11 is then ultrasonically welded or otherwise similarly attached to housing 15 so as to define the interior chamber 17.

Housing 15 in the most preferred embodiment includes an air inlet in the annular side walls thereof. This air inlet is the means through which pressurized fluid is provided in the internal chamber 17. This providing of fluid may be a one time event in which a plug is then inserted into the air inlet thereby defining the invention as an air spring. Alternatively, a pressurized fluid source may be attached via the air inlet thereby allowing the pressure within pressurized chamber 17 to be altered such that the invention is an air actuator.

In sum, the entire air spring and/or air actuator 10 is molded in a two-piece construction out of a thermoplastic elastomer that lacks any reinforcing cords therein. The preferred thermoplastic elastomer is a polyester elastomer marketed under the name Hytrel® by Dupont. The walls of the rigid housing 15 and rigid piston 12 are of a substantial thickness so as to be rigid and load bearing, while the walls of the rolling or flexible membrane 16 are thin so as to allow flexible rolling of the membrane as the rigid housing and rigid piston are axially moved in relation to one another. Overall, the rigid housing functions as an integral support can in which the flexible membrane 16 and rigid piston 12 seat in to and out of as shown, respectively, in FIGS. 4 and 3. Welded cap 11 is similarly molded as the other piece out of thermoplastic elastomers that are not reinforced. Clips 20 are molded within piston 12 and cap 11 so as to provide an integral connection feature in the air spring. Finally, cap 11 is welded to housing 15 so as to define the pressurizable internal chamber 17.

Accordingly, the improved thermoplastic elastomeric air spring is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved thermoplastic elastomeric air spring is constructed and used, the characteristics of the construction, and the advantageous, new and useful results obtained; the new and useful structures, devices, elements, arrangements, parts and combinations, are set forth in the appended claims.

What is claimed is:

1. An air spring comprising:
    an integrally molded one-piece non-metallic body including a thin walled, flexible membrane extending between a thick walled, rigid housing and a thick walled, rigid piston thereby defining an internal chamber open only at an end of the housing opposing the piston, whereby the flexible membrane selectively rolls as the housing and piston are axially moved to and away from one another; and
    cap attachable within the open end to enclose the internal chamber.
2. The air spring of claim 1 wherein the integrally molded body is molded of a thermoplastic elastomer.
3. The air spring of claim 2 wherein the thermoplastic elastomer is a polyester elastomer.
4. The air spring of claim 3 wherein the polyester elastomer is Hytrel®.
5. The air spring of claim 2 wherein the integrally molded body is blow molded of a thermoplastic elastomer.
6. The air spring of claim 2 wherein the integrally molded body is injection molded of a thermoplastic elastomer.
7. The air spring of claim 1 wherein the integrally molded body is molded of nonreinforced thermoplastic elastomer.
8. The air spring of claim 1 wherein the integrally molded body is molded of urethane.
9. The air spring of claim 1 wherein the thick walled rigid piston is selectively seatable within the thick walled rigid housing.
10. The air spring of claim 1 wherein the thin walled flexible membrane is of a conical shape.
11. The air spring of claim 1 wherein the thick walled rigid housing is of a cylindrical shape.
12. An integrally molded, one piece non-metallic air spring body comprising:
    a thick walled, rigid housing of a tubular shape having an inner and outer surface, and a pair of opposed ends;
    a thick walled, rigid piston of a cup-shape with a base and at least one wall extending therefrom to an outermost edge; and
    a thin walled, flexible membrane substantially radially extending inward from the inner surface of the thick walled, rigid housing to the outermost edge of the thick walled, rigid piston thereby defining an internal chamber open only at an end of the housing opposing the piston, whereby the flexible membrane selectively rolls as the housing and piston are axially moved to and away from one another.
13. The integrally molded, one piece air spring body of claim 12 used in conjunction with an integrally molded cap attachable within the open end to enclose the internal chamber.
14. The integrally molded, one piece air spring body of claim 12 wherein the thin walled, flexible membrane angles into the thick walled, rigid piston.
15. The integrally molded, one piece air spring body of claim 12 wherein the body is molded of a thermoplastic elastomer.
16. The integrally molded, one piece air spring body of claim 15 wherein the thermoplastic elastomer is a polyester elastomer.
17. The integrally molded, one piece air spring body of claim 16 wherein the polyester elastomer is Hytrel®.
18. The integrally molded, one piece air spring body of claim 12 wherein the body is blow molded of a thermoplastic elastomer.
19. The integrally molded, one piece air spring body of claim 12 wherein the body is injection molded of a thermoplastic elastomer.
20. The integrally molded, one piece air spring body of claim 12 wherein the body is molded of nonreinforced thermoplastic elastomer.
21. The integrally molded, one piece air spring body of claim 12 wherein the body is molded of urethane.

* * * * *